United States Patent
Liu (10) Patent No.: US 10,192,588 B2
(45) Date of Patent: Jan. 29, 2019

(54) METHOD, DEVICE, AND COMPUTER-READABLE MEDIUM FOR TAGGING AN OBJECT IN A VIDEO

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/224,997

(22) Filed: Aug. 1, 2016

(65) Prior Publication Data

US 2017/0062014 A1    Mar. 2, 2017

(30) Foreign Application Priority Data

Aug. 24, 2015 (TW) .............................. 104127575 A (51) Int. Cl.
G11B 27/34 (2006.01)
G11B 27/32 (2006.01)

(52) U.S. Cl.
CPC ............ G11B 27/34 (2013.01); G11B 27/322 (2013.01)

(58) Field of Classification Search
CPC .............................. G11B 27/34; G11B 27/322
See application file for complete search history.

(56) References Cited

U.S. PATENT DOCUMENTS

| | | | | |
|---|---|---|---|---|
| 8,656,282 B2* | 2/2014 | Kulas | ................. | G06F 3/04842 715/723 |
| 9,357,242 B2* | 5/2016 | Sinha | ................. | G06F 17/3082 |
| 2005/0216838 A1* | 9/2005 | Graham | ................. | G06F 3/1206 715/713 |
| 2009/0110245 A1* | 4/2009 | Thorn | ................. | G03B 13/00 382/118 |
| 2010/0169503 A1* | 7/2010 | Kollmansberger | ... | H04L 65/605 709/231 |
| 2011/0134321 A1* | 6/2011 | Berry | ................. | G11B 27/10 348/464 |
| 2011/0307491 A1* | 12/2011 | Fisk | ................. | G06F 17/30056 707/741 |
| 2012/0054691 A1* | 3/2012 | Nurmi | ................. | G06Q 10/10 715/854 |
| 2012/0239690 A1* | 9/2012 | Asikainen | ......... | G06F 17/30038 707/770 |
| 2013/0094831 A1* | 4/2013 | Suzuki | ................. | H04N 21/8456 386/230 |
| 2013/0294642 A1* | 11/2013 | Wang | ................. | G06F 17/30855 382/103 |
| 2014/0023341 A1* | 1/2014 | Wang | ................. | H04N 9/87 386/240 |

(Continued)

*Primary Examiner* — Mishawn N Hunter
(74) *Attorney, Agent, or Firm* — Andrew M. Calderon; Roberts Mlotkowski Safran Cole & Calderon, P.C.

(57) ABSTRACT

A method for tagging an object in a video includes playing a video with a plurality of frames, selecting a target object in a playing frame by a cursor, obtaining at least one timestamp and at least one bounding box that correspond to the target object, from an object meta data, showing a selectable area in the playing frame according to the bounding box corresponding to the timestamp of the playing frame, generating at least one tag function item linking to the selectable area, and tagging the target object according to one of the at least one tag function item. Therefore, the target object in the video can be tagged in an easy and fast way.

15 Claims, 11 Drawing Sheets

(56) References Cited

U.S. PATENT DOCUMENTS

| | | | |
|---|---|---|---|
| 2014/0086458 A1* | 3/2014 | Rogers | G10L 15/00 382/118 |
| 2014/0161417 A1* | 6/2014 | Kurupacheril | H04N 5/76 386/241 |
| 2014/0169679 A1* | 6/2014 | Harada | H04N 21/251 382/195 |
| 2014/0280479 A1* | 9/2014 | Kazerani | H04L 43/10 709/203 |
| 2016/0150284 A1* | 5/2016 | Sokolov | H04N 21/4622 725/38 |
| 2016/0274743 A1* | 9/2016 | Sica | G06F 3/0482 |

* cited by examiner

METHOD, DEVICE, AND COMPUTER-READABLE MEDIUM FOR TAGGING AN OBJECT IN A VIDEO

CROSS-REFERENCES TO RELATED APPLICATIONS

This non-provisional application claims priority under 35 U.S.C. § 119(a) on Patent Application No. 104127575 filed in Taiwan, R.O.C. on 2015 Aug. 24, the entire contents of which are hereby incorporated by reference.

BACKGROUND

Technical Field

The instant disclosure relates to security surveillance technology, in particular, to a method, a device, and a computer-readable medium for tagging an object in a video.

Related Art

In recent years, security surveillance systems are universal, and video surveillance systems are widely utilized for security purposes. For example, the security surveillance systems are installed in airports, train, or subway stations, banks, hotels, etc., so that videos of these locations can be continuously captured by the security surveillance systems for real-time monitoring or for recording and storage.

A conventional security surveillance system commonly includes several cameras for continuously capturing videos of a monitored environment, and the system stores the videos captured by the cameras. In other words, the security surveillance system records the videos of the monitored environment. The security surveillance system has a video playback function, so that a user can check interested or suspected objects in the frames of the video.

During the video playback, when the user finds interested or suspected objects in the frames of the video, the user can use a tag function provided by the security surveillance system to tag the frames showing the interested or suspected objects.

In a conventional way, the user needs to continuously checking the frames of the videos as well as dragging the timeline to change the play time of the video for finding and tagging the possible start time that indicates the appearing of the object; then, the user uses the same way to find and tag the possible end time that indicates the disappear of the object. However, such a tagging way is complicated and inefficient. When the user has to do the tagging task for several cameras and/or for several objects, the task will become a huge burden for the user.

SUMMARY

In one embodiment, a method for tagging an object in a video comprises: playing a video having a plurality of frames; selecting a target object in a playing frame by a cursor; obtaining at least one timestamp and at least one bounding box that correspond to the target object from an object meta data; showing a selectable area in the playing frame according to the bounding box corresponding to the timestamp of the playing frame; generating at least one tag function item linking to the selectable area; and tagging the target object according to one tag function item, wherein each timestamp corresponds to one of the frames and one bounding box.

In one embodiment, a device for tagging an object in a video comprises a processor, an image capture unit, and a display unit. The processor is for executing the method for tagging an object in a video according to any embodiment of the instant disclosure. The image capture unit is for capturing the video. The display unit is for displaying the playing frame.

In one embodiment, a computer program product comprises a program instruction stored in a computer readable medium. The program instruction is loaded and executed by a computer, to implement the method for tagging an object in a video according to any embodiment of the instant disclosure.

As above, according to the method, the position and the timestamp of the target object of the playing frame in a corresponding record video can be directly obtained from the object meta data, then a selectable area is displayed on the target object of the playing frame accordingly, so that a computer executing the method can rapidly and automatically tagging the target object in the video. Therefore, the record video can be managed, playbacked, and exported efficiently.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
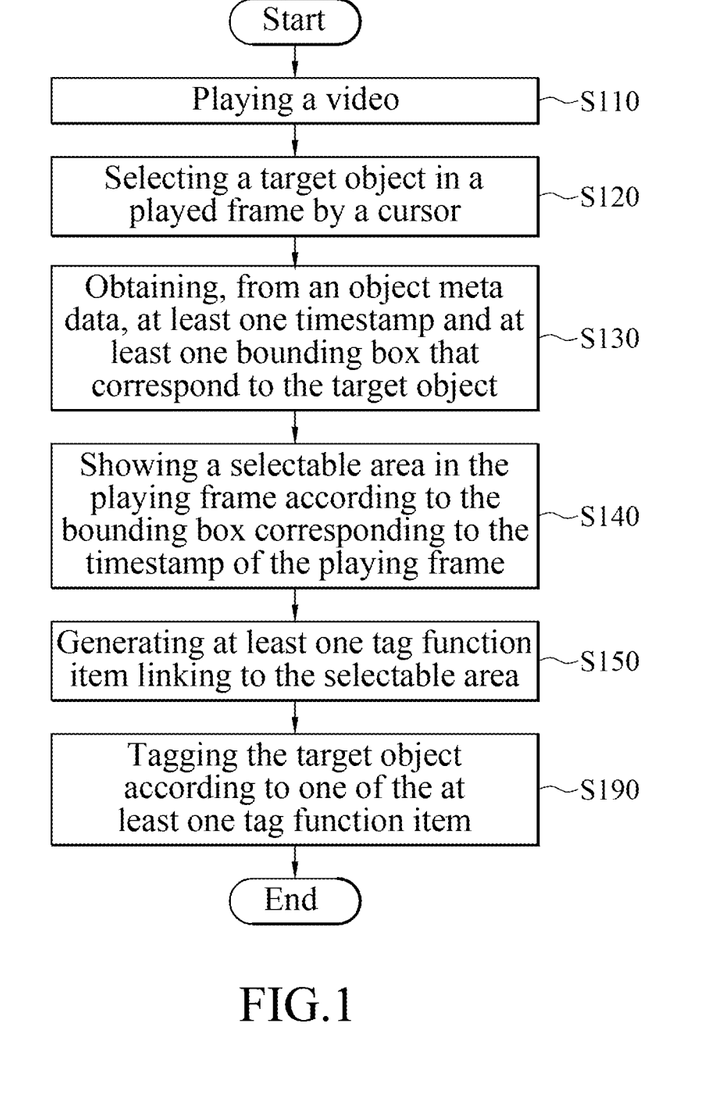
FIG. 1 illustrates a flowchart of a method for tagging an object in a video according to an exemplary embodiment of the instant disclosure.
Figure 2:
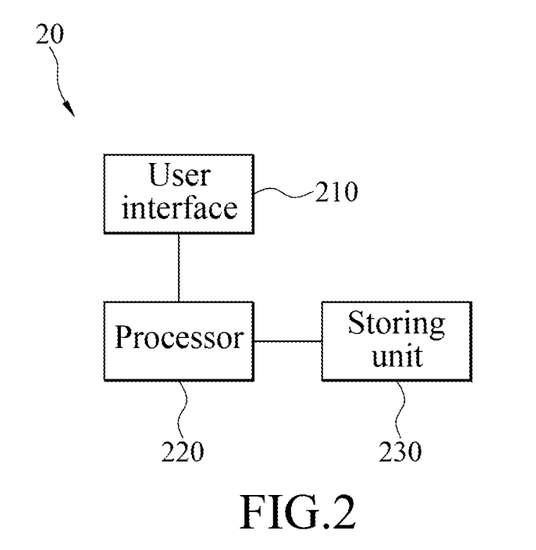
FIG. 2 illustrates a schematic functional block view of an electronic device for implementing the method shown in FIG. 1.

FIG. 1 illustrates a flowchart of a method for tagging an object in a video according to an exemplary embodiment of the instant disclosure. FIG. 2 illustrates a schematic functional block view of an electronic device for implementing the method shown in FIG. 1.

Please refer to FIGS. 1 and 2. The method for tagging an object in a video according any embodiment of the instant disclosure can be implemented by a computer program. Therefore, when a computer (i.e., any electronic device 20 having a user interface 210, a processor 220, and a storing unit 230, e.g., a security surveillance system) loads and executes the program, the method for tagging an object in a video according any embodiment of the instant disclosure can be implemented. In some embodiments, the user interface 210 may be a touch display unit, an assembly of a normal display unit and several solid buttons, an assembly of a touch display unit and one or more solid buttons, etc. Wherein, the solid buttons may be implemented by a keyboard, a mouse, or the both.

In this embodiment, the storing unit 230 stores a video (i.e., a video record). Wherein, the video has a plurality of frames. Each frame has a timestamp. In this embodiment, the video in the storing unit 230 may be oriented from a capture unit of the electronic device 20 or an external device (e.g. a camera, a video server, etc.). Wherein, the external device may be wirely or wirelessly connected to the electronic device 20. In this embodiment, the external device may be a local device (i.e., the external device and the electronic device 20 are devices connected by a same intranet). Alternatively, the external device may be a remote device (i.e., the external device is connected with the electronic device through the interna).

In addition, the video has an object meta data. The object meta data comprises every target object in each frame, the timestamps corresponding to the frames that show the target objects, the positions of the corresponding frame which the target objects are located at (i.e., the bounding box), and the relationships among them (target object, timestamp, and position). In other words, the object meta data has several target objects. Each target object corresponds to one timestamp and one bounding box. The three related information forms a correspondence among the target objects, the timestamps, and the bounding boxes. The target objects of the object meta data may represent the images of the same objects, the images of different objects, or combination thereof. In this embodiment, the object meta data may be obtained by performing detection and analysis to the recorded original video (e.g., movement detection and analysis, human face detection and analysis).

In some embodiments, the method for tagging an object in a video according to the instant disclosure may be a video playback function of the security surveillance system. When a user executes the video playback function, the processor 220 reads out a video in the storing unit 230 and plays the video on a display unit (i.e., the user interface 210) of the electronic device 20 (step S110).

Figure 3:
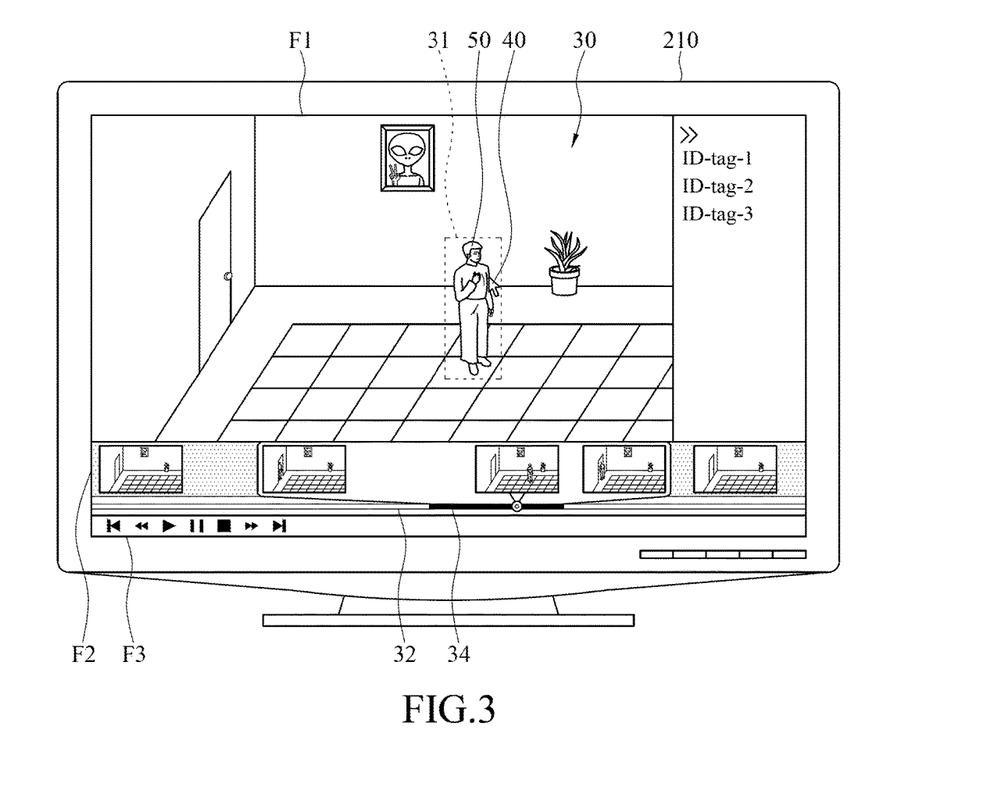
FIG. 3 illustrates a schematic view of a first embodiment of a playback window displayed on a user interface of the electronic device shown in FIG. 2.

Please refer to FIG. 3. In some embodiments, during the video playback, the processor 220 displays a playback window on the display unit and plays the video on the playback window. In this embodiment, the playback window comprises a display frame F1, a time frame F2, and a control frame F3. During the video is playing, the processor 220 displays a current displaying frame (hereinafter called playing frame 30) in the display frame F1 and displays a main timeline 32 in the time frame F2 according to the timestamps of all the frames. The processor 220 provides several control buttons in the control frame F3. In this embodiment, the control buttons may be, for example, a play button, a forward button, a backward button, a stop button, a pause button, volume tuning buttons, or any of the combinations thereof.

The processor 220 provides a cursor 40 on the user interface 210 and detects the motion of the cursor 40 on the playing frame 30. In this embodiment, the user may operate the user interface 210 to move the cursor 40 to a target object 50 which is interesting or suspected (i.e., move the cursor 40 to the image of the target object 50 of the playing frame 30) and select the target object 50.

When the cursor 40 is moved on the target object 50 of the playing frame 30 (e.g., when the cursor 40 is partially overlapped with the image of the target object 50 of the playing frame 30), the processor 220 detects that the cursor 40 selects a target object 50 in the playing frame 30 (step S120). Then, the processor 220 obtains at least one timestamp and at least one bounding box that correspond to the target object 50 from an object meta data (step S130). In some embodiments, the processor 220 recognizes what the target object 50 is, according to the position of the playing frame 30 which the cursor 40 is located on. Then, the processor 220 finds out, from the object meta data, at least one group of correspondence having the target object 50 and then obtain at least one timestamp and at least one bounding box in the at least one group of correspondence.

In addition, the processor 220 also shows a selectable area 31 in the playing frame 30 according to the bounding box of the target object 50 corresponding to the timestamp of the playing frame 30 (step S140), as shown in FIG. 3. Moreover, the processor 220 generates at least one tag function item linking to the selectable area 31 (step S150).

Figure 4:
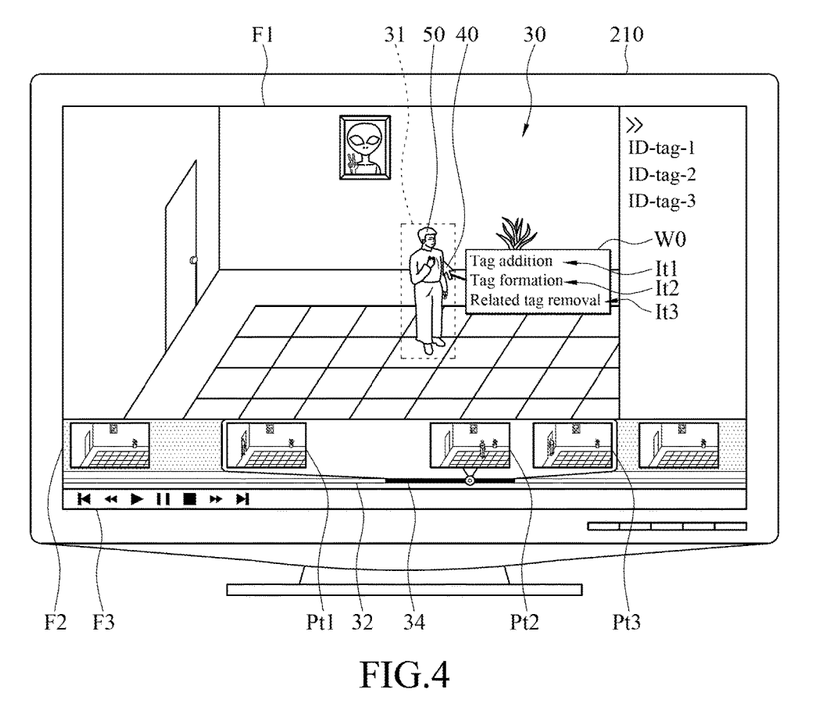
FIG. 4 illustrates a schematic view of a second embodiment of the playback window displayed on the user interface of the electronic device shown in FIG. 2.

In some embodiments, when a user selects (e.g. clicks the right button of the mouse) the target object 50 by stopping the cursor 40 over the target object 50 of the playing frame 30 and clicking, the processor 220 displays a list block WO having at least one tag function item It1, It2, It3 in the playing frame 30 corresponding to the cursor 40 on the playing frame 30, as shown in FIG. 4. In some embodiments, when the listing block WO is displaying, the listing block WO corresponds to the cursor 40, but embodiments are not limited thereto.

When the user selects any of the tag function item It1, It2, It3, the processor 220 tags the target object 50 according to the selected tag function item It1, It2, It3 (step S190).

In some embodiments, each target object 50 in the object meta data is represented by its object recognition code. In this embodiment, the processor 220 finds out an object recognition code of the target object 50 from the object meta data according to the position of the playing frame 30 which the cursor 40 is located on (the cursor 40 is within a bounding box) and the timestamp of the playing frame 30. Then, according to the object recognition code, the processor 220 obtains all the timestamps and all the bounding boxes corresponding to the object recognition code from the object meta data. When the user selects (e.g. clicks the right button of the mouse) one of tag function items It1, It2, It3, the processor 220 receives a selected signal of the selected tag function item It1, It2, It3 and tags the frame for the timestamp belonging to each bounding box according to each bounding box corresponding the object recognition code in response to the selected signal.

In some embodiments, when the cursor 40 selects one of the tag function items It1, It2, It3, the processor 220 receives a selected signal of the selected tag function item It1, It2, It3. Then, the processor 220 provides a choosing box 36 to the corresponding frame according to each timestamp and the bounding box corresponding to each timestamp in response to the selected signal. Therefore, when any of the frames for the timestamps corresponding to the target object 50 is the playing frame 30, the processor 220 performs the choosing box 36 on the target object 50 of the playing frame 30, as shown in FIG. 5.

In some embodiments, the size of each choosing box 36 and the position of playing frame 30 which the choosing box 36 is located on can be determined by the corresponding bounding box.

In some embodiments, the area enclosed by each choosing box 36 is the selectable area 31 corresponding to the choosing box 36.

Figure 5:
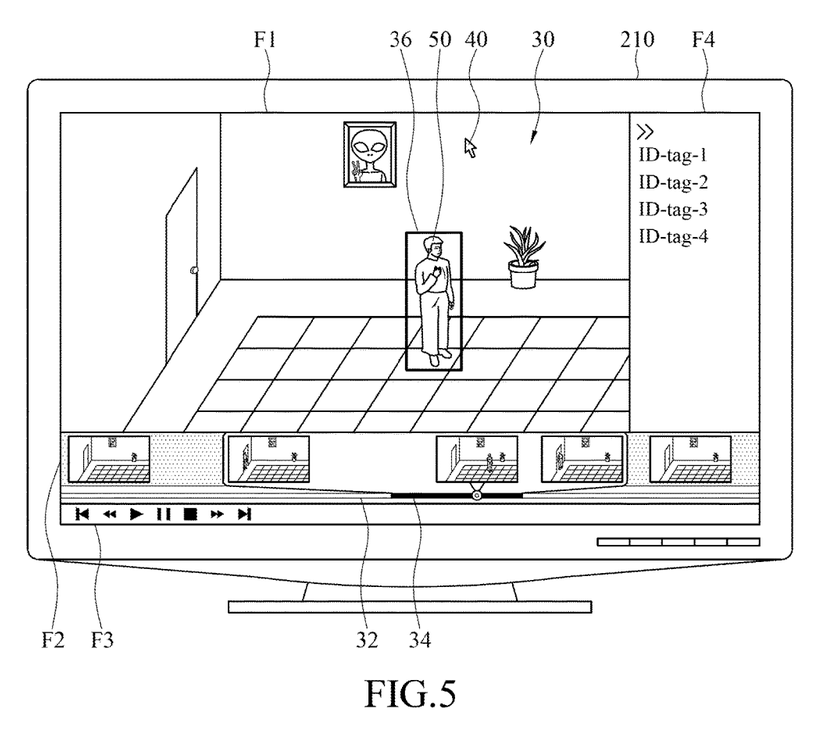
FIG. 5 illustrates a schematic view of a third embodiment of the playback window displayed on the user interface of the electronic device shown in FIG. 2.
Figure 6:
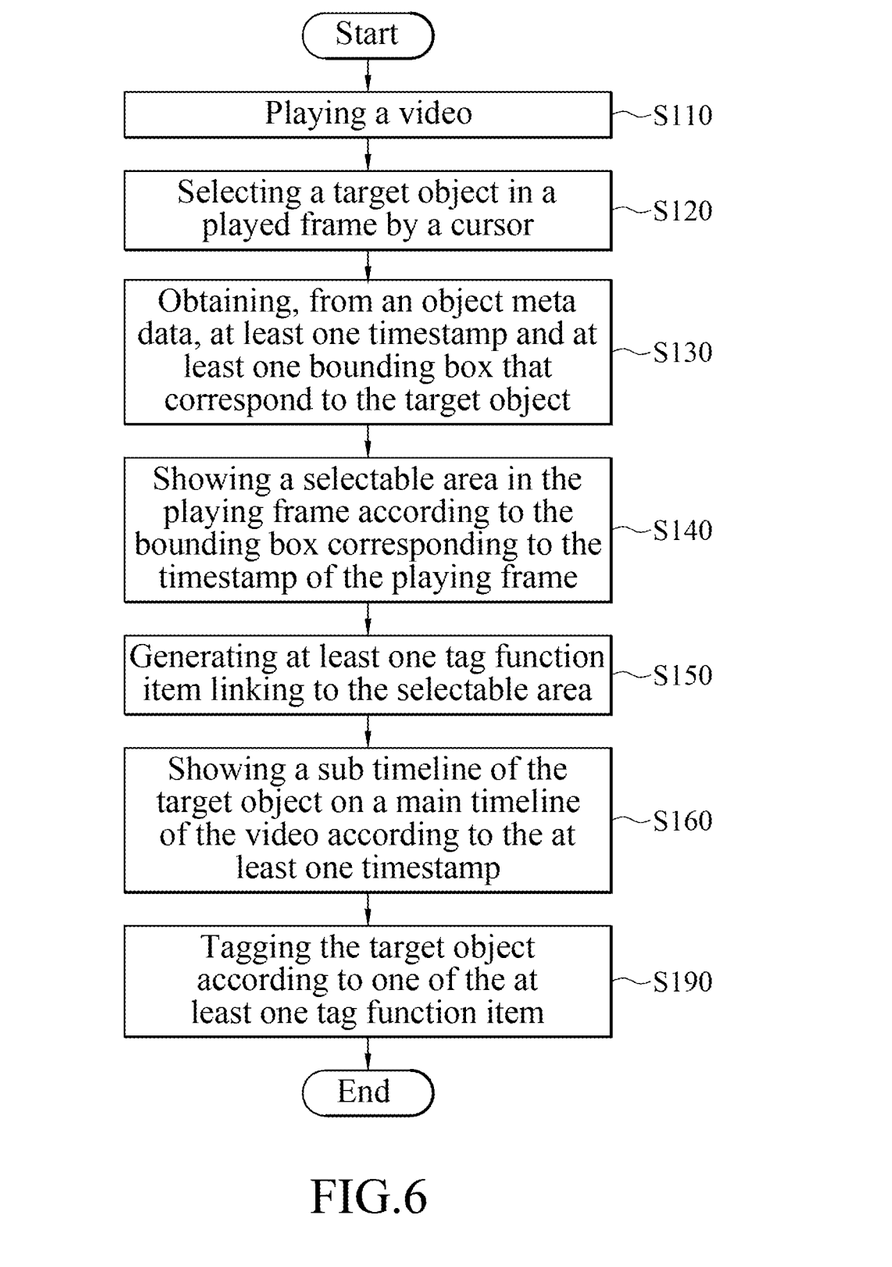
FIG. 6 illustrates a flowchart of a method for tagging an object in a video according to another embodiment of the instant disclosure.

In some embodiments, as shown in FIG. 6, when the cursor 40 is moved on the target object 50 of the playing frame 30, the processor 220 shows a sub timeline 34 of the target object 50 on the main timeline 32 according to all the obtained timestamps (as shown in FIGS. 3 to 5) (step S160). In some embodiments, the sub timeline 34 has at least one thumbnail image Pt1, Pt2, Pt3 of at least one frame, the at least one frame corresponds to at least one timestamp of the target object 50. In some embodiments, the earliest timestamp among the timestamps of the target object 50 (e.g., the timestamp of the thumbnail image Pt1) is defaulted as a mark-in time, and the latest timestamp among the timestamps of the target object 50 (e.g., the timestamp of the thumbnail image Pt3) is defaulted as a mark-out time.

Figure 7:
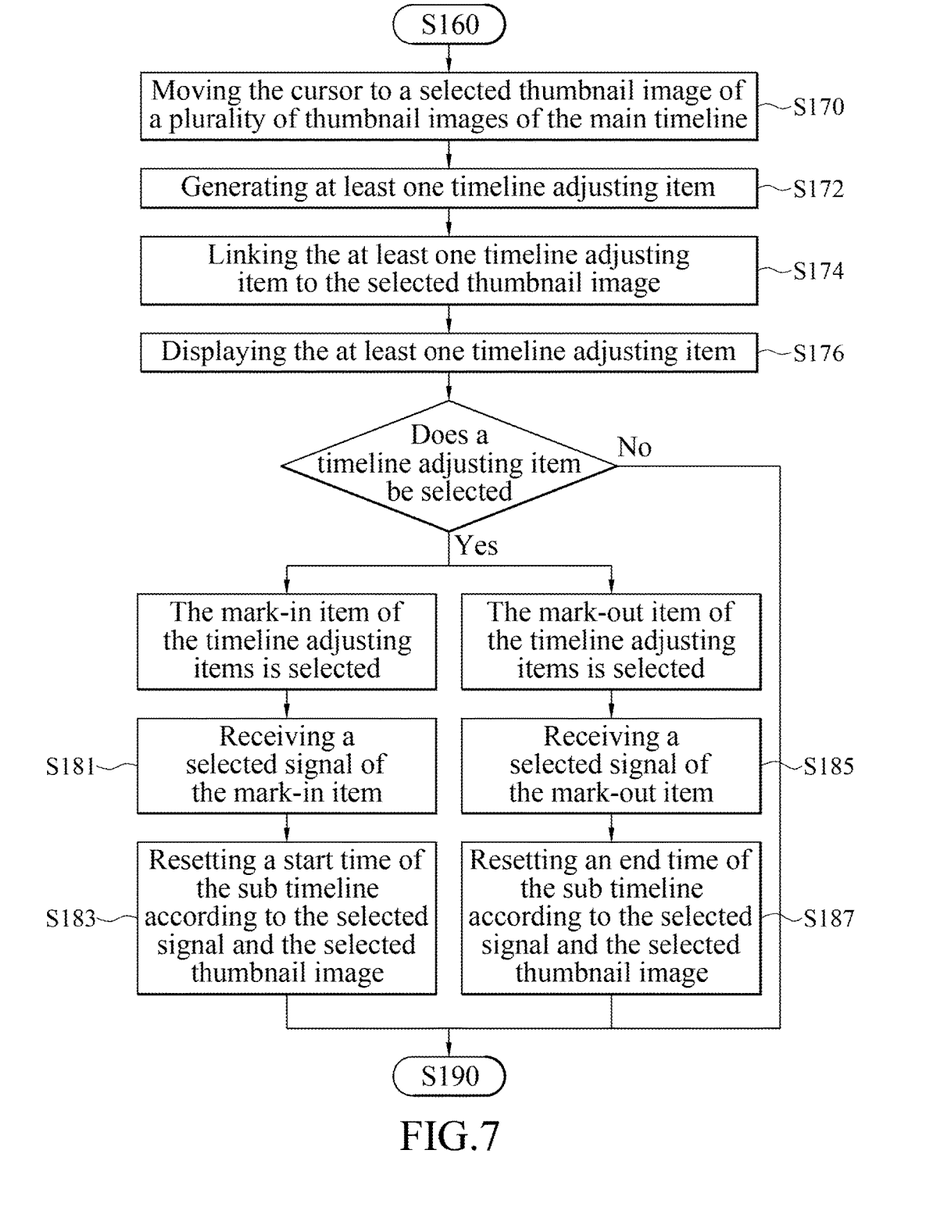
FIG. 7 illustrates a flowchart of a method for tagging an object in a video according to yet another embodiment of the instant disclosure.
Figure 8:
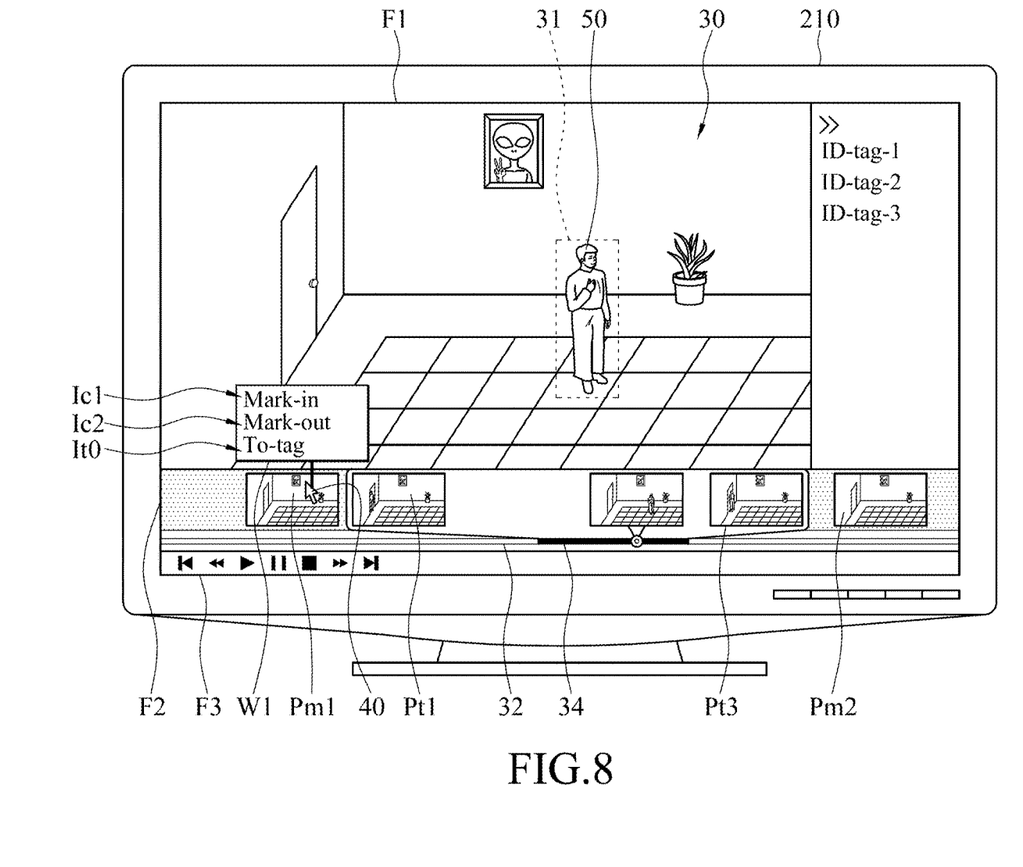
FIG. 8 illustrates a schematic view of a fourth embodiment of the playback window displayed on the user interface of the electronic device shown in FIG. 2.

In some embodiments, the user may select the thumbnail image directly to change the mark-in time or the mark-out time. Please refer to FIGS. 7 and 8. The processor 220, based on the user's operation of the user interface 210, moves the cursor 40 to a selected thumbnail image (in this embodiment, i.e., the thumbnail image Pm1) of the thumbnail images Pm1, Pm2, Pm3 of the main timeline 32 (step S170). When the user selects (e.g. clicks the right button of the mouse) the selected thumbnail image Pm1, the processor 220 detects that the cursor 40 selects the selected thumbnail image Pm1 and generates at least one timeline adjusting item Ic1, Ic2 (step S172). In this embodiment, the processor 220 links the timeline adjusting item Ic1, Ic2 with the selected thumbnail image Pm1 and displays the timeline adjusting item Ic1, Ic2 (as shown in FIG. 8) (step S176).

In some embodiments, the processor 220 displays a listing block W1 having the timeline adjusting item Ic1, Ic2 in the playback window according to the position of the playback window which the cursor 40 is located on or according to the position of the playback window which the selected thumbnail image Pm1 is located on. Therefore, the listing block W1 can be provided for the user as a reference and for changing the start time or the end time of the sub timeline 34.

For example, the processor 220 may generate and display the listing block W1 linking to the cursor 40 or the selected thumbnail image upon receiving the selected signal of the selected thumbnail image.

After the listing block is displayed, the processor 220 detects the timeline adjusting items Ic1, Ic2 to check if any of the timeline adjusting items Ic1, Ic2 is selected. In some embodiments, the at least one timeline adjusting item Ic1, Ic2 may be a mark-in item (e.g., the timeline adjusting item Ic1), a mark-out item (e.g., the timeline adjusting item Ic2), or the combination thereof.

In some embodiments, when the user selects (e.g. clicks the right button of the mouse) the mark-in item linking to the selected thumbnail image Pm1, the processor 220 receives a selected signal of the mark-in item (step S181). Then, the processor 220 resets the start time of the sub timeline 34 according to the selected signal and the selected thumbnail image Pm1 (step S183). In the case that the duration of the sub timeline 34 is between the timestamp of the thumbnail image Pt1 and the timestamp of the thumbnail image Pt3, as shown in FIG. 7, the processor 220 receives the selected signal of the timeline adjusting item Ic1 when the cursor 40 selects the timeline adjusting item Ic1 of the selected thumbnail image Pm1. In addition, the processor 220 changes the mark-in time of the sub timeline 34 from the timestamp of the thumbnail image Pt1 to the timestamp of the selected thumbnail image Pm1 in response to the selected signal of the timeline adjusting item Ic1. In other words, the duration of the sub timeline 34 is changed from the interval between the timestamp of the thumbnail image Pt1 and the timestamp of the thumbnail image Pt3 to the interval between the timestamp of the thumbnail image Pm1 and the timestamp of the thumbnail image Pt3.

In some embodiments, when the user selects (e.g. clicks the right button of the mouse) the mark-out item linking to the selected thumbnail image Pm2, the processor 220 receives a selected signal of the mark-out item (step S185). Then, the processor 220 resets the end time of the sub timeline 34 according to the selected signal and the selected thumbnail image Pm2 (step S187). In the case that the duration of the sub timeline 34 is between the timestamp of the thumbnail image Pt1 and the timestamp of the thumbnail image Pt3, as shown in FIG. 7, the processor 220 receives the selected signal of the timeline adjusting item Ic2 when the cursor 40 selects the timeline adjusting item Ic2 of the selected thumbnail image Pm2. In addition, the processor 220 changes the mark-out time of the sub timeline 34 from the timestamp of the thumbnail image Pt3 to the timestamp of the selected thumbnail image Pm2 in response to the selected signal of the timeline adjusting item Ic2. In other words, the duration of the sub timeline 34 is changed from the interval between the timestamp of the thumbnail image Pt1 and the timestamp of the thumbnail image Pt3 to the interval between the timestamp of the thumbnail image Pm1 and the timestamp of the thumbnail image Pm2.

Figure 9:
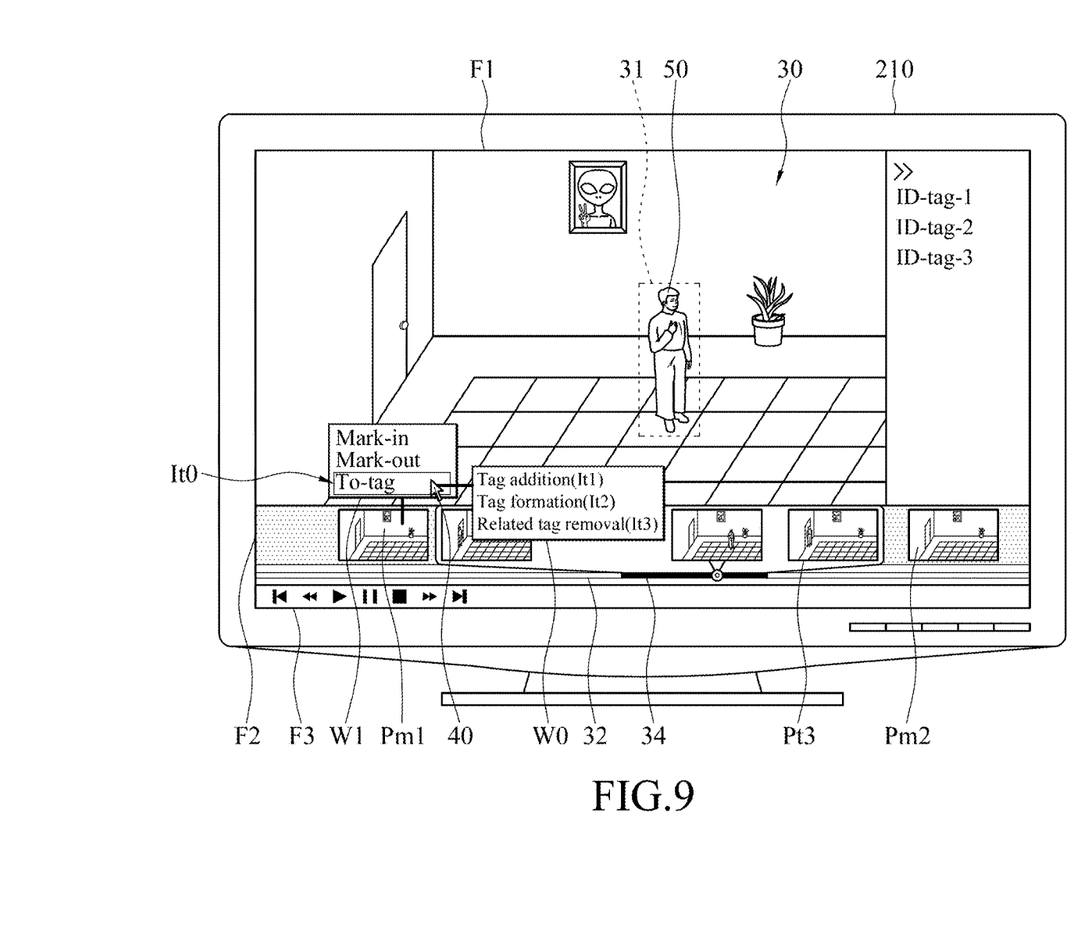
FIG. 9 illustrates a schematic view of a fifth embodiment of the playback window displayed on the user interface of the electronic device shown in FIG. 2.

In some embodiments, the listing block W1 further has a to-tag item It0 provided for the user to tag the target object 50 in the sub timeline 34. When the to-tag item It0 is selected (e.g., the user uses the cursor 40 to select the to-tag item It0), the processor 220 displays the listing block W0 having at least one tag function item It1, It2, It3 on the user interface 210 upon receiving the selected signal of the to-tag item It0, as shown in FIG. 9.

In some embodiments, the change of the start time or the end time of the sub timeline 34 may be done before the generation of the tagging of the target object 50, or may be done after the generation of the tagging of the target object 50. In other words, the processor 220 can respond to the selected signal of the selected thumbnail image to generate and display the listing block W1 corresponding to the selected thumbnail image no matter before or after the generation of the tagging of the target object. Therefore, the listing block W1 can be provided for the user as a reference and for changing the start time or the end time of the sub timeline 34.

In some embodiments, the at least one tag function item may be a tag formation item, a tag addition item, a related tag removal item, or the combination thereof.

Figure 10:
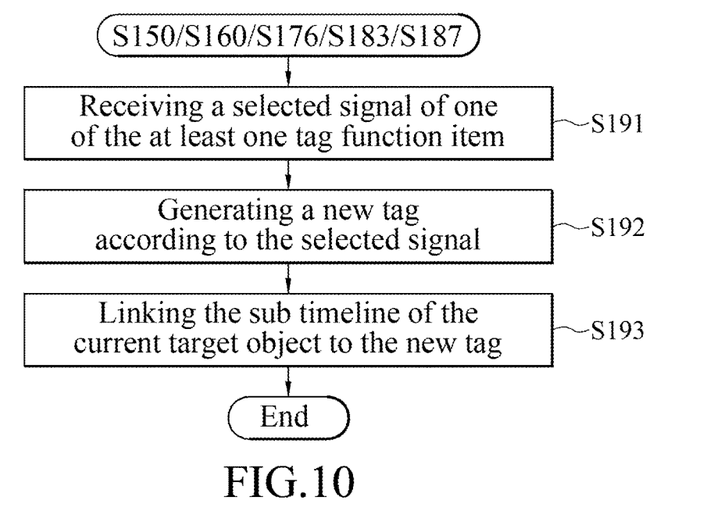
FIG. 10 illustrates a detailed flowchart of one embodiment of the step S190 shown in FIGS. 1, 6, and 7.

In some embodiments, the tag formation item is for the user to generate a new tag for the target object 50. For example, in FIG. 10, when the user selects the tag formation item (e.g., the tag function item Id), the processor 220 receives a selected signal of the tag formation item (step S191). Then, the processor 220 generates a new tag ID-tag-4 in response to the selected signal of the tag formation item (as shown in FIG. 5) (step S192), and the processor 220 links the sub timeline 34 (namely, the timestamps from the thumbnail image Pt1 to the thumbnail image Pt3) of the current target object 50 (which is in the playing frame 30) to the tag ID-tag-4 (step S193).

Figure 11:
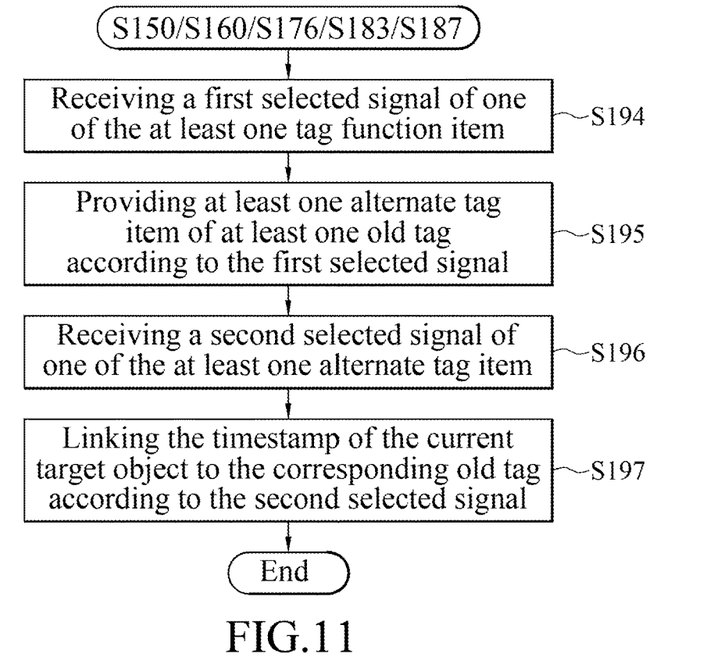
FIG. 11 illustrates a detailed flowchart of another embodiment of the step S190 shown in FIGS. 1, 6, and 7.
Figure 12:
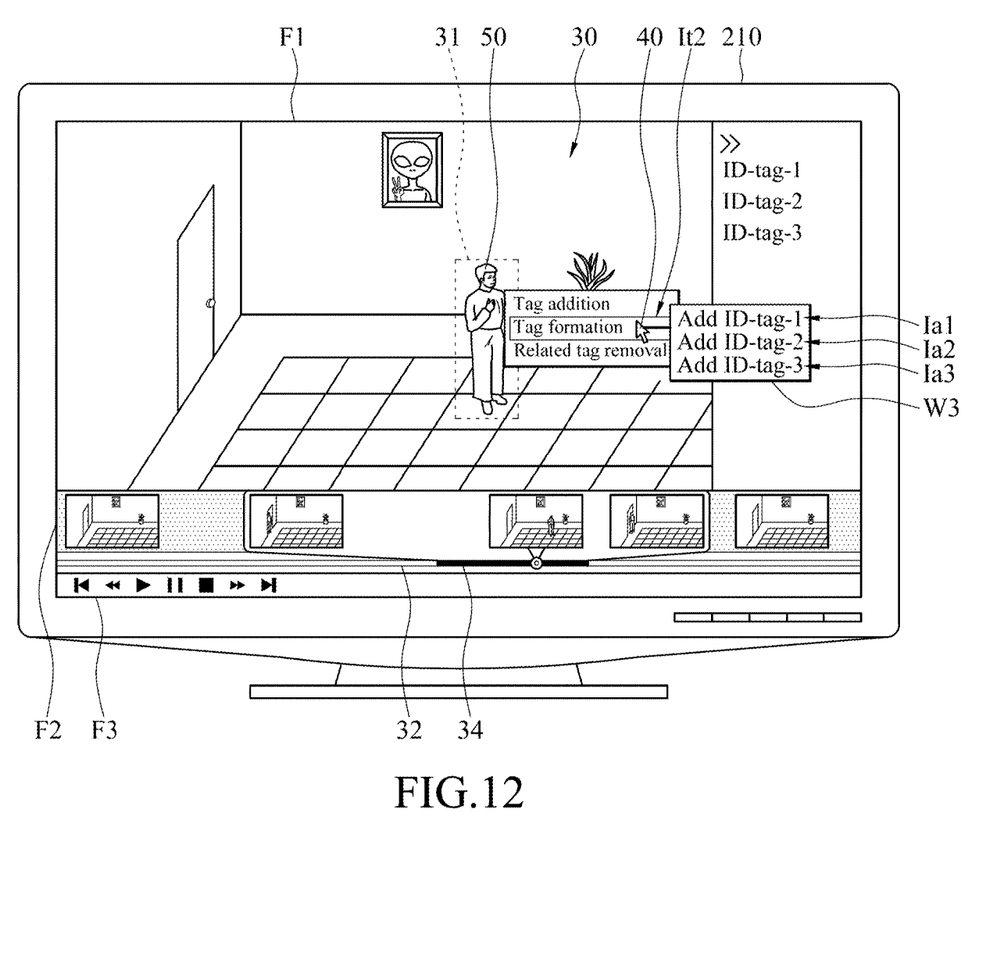
FIG. 12 illustrates a schematic view of a sixth embodiment of the playback window displayed on the user interface of the electronic device shown in FIG. 2.

In some embodiments, the tag addition item is for the user to add the target object 50 to any of existed tags (hereinafter called old tags). For example, as shown in FIG. 11, when the user selects the tag addition item (e.g., the tag function item It2), the processor 220 receives a selected signal of the tag addition item (hereinafter called a first selected signal) (step S194). Then, the processor 220 provides alternate tag items Ia1, Ia2, Ia3 according to the first selected signal (as shown in FIG. 12) (step S195). Therefore, the user can decide which of the old tags ID-tag-1, ID-tag-2, ID-tag-3 is to be tagged on the target object 50. In some embodiments, as shown in FIG. 12, when the processor 220 detects that the tag addition item of the tag function items is selected, the processor 220 obtains all the old tags ID-tag-1, ID-tag-2, ID-tag-3 of the video from the storing unit 230 in response to the first selected signal and displays, in the playback window, the listing block W1 having the alternate tag items Ia1, Ia2, Ia3 of the old tags ID-tag-1, ID-tag-2, ID-tag-3.

When the user selects one of the alternate tag items (in this embodiment, the user selects the alternate tag item Ia1), the processor 220 receives a selected signal of the alternate tag item Ia1 (hereinafter called a second selected signal) (step S196). Then, the processor 220 links the timestamps (namely, the timestamps from the thumbnail image Pt1 to the thumbnail image Pt3) corresponding to the current target object 50 (which is in the playing frame 30) to the old tag ID-tag-1 corresponding to the alternate tag item Ia1 (step S197). In other words, the processor 220 adds the sub timeline 34 of the current target object 50 to the old tag ID-tag-1 corresponding to the alternate tag item Ia1.

In some embodiments, the related tag removal item is for the user to remove the records of the target object 50 related to the old tags. For example, when the user selects the related tag removal item (e.g., the tag function item It3), the processor 220 receives a selected signal of the related tag removal item. Then, in response to the selected signal of the related tag removal item, the processor 220 finds out the related tag linked to the timestamps corresponding to the target object 50 from all of the old tags stored in the storing unit 230. When a related tag is only linked to the timestamps of the current target object 50, the processor 220 deletes the related tag from the storing unit 230. When the related tag is not only linked to the timestamps of the current target object 50 but further linked to the timestamps of other target objects 50, the processor 220 removes the link between the related tag and the timestamps corresponding to the current target object 50, namely, removes the link record between the related tag and the timestamps corresponding to the current target object 50 from the storing unit 230.

In some embodiments, as shown in FIG. 5, the playback window may further comprise a manage frame F4. The manage frame F4 records all the tags ID-tag-1, ID-tag-2, ID-tag-3, ID-tag-4. In this embodiment, each tag represents one target object 50. When any of the tags ID-tag-1, ID-tag-2, ID-tag-3, ID-tag-4 in the manage frame F4 is selected, in response to the selected signal of the selected tag, the processor 220 switches the content of the display frame F1 and the content of the time frame F2, namely, the sub timeline 34 linking to the selected tag is displayed in the time frame F2, and the frame of any timestamp in the sub timeline 34 linking to the selected tag is taken as the playing frame 30 and displayed in the display frame F1.

In some embodiments, the playback window further has an export function (which may be implemented by an export button of the control frame F3, or may be implemented by an export item linking to the manage frame F4 or linking to any of the tags ID-tag-1, ID-tag-2, ID-tag-3, ID-tag-4 in the manage frame F4. Therefore, the user can operate the processor 220 to retrieve the fragment of the video corresponding to the timestamp linking to each of the tags ID-tag-1, ID-tag-2, ID-tag-3, ID-tag-4 as an individual file.

In some embodiments, the target object may be the image of a human, an animal, an extraordinary thing (for example, the flame in fire, the water in flood), or other images which may be continuously changed in sequent frames.

In some embodiments, the processor 220 may be implemented by one or more microprocessors, microcontrollers, digital signal processors, microcomputers, central processing units (CPU), field programmable gate arrays (FPGA), programmable logic devices (PLD), state machines, logic circuits, analog circuits, digital circuits, and/or any processing unit for signal processing (analog and/or digital) based on operation commands.

In some embodiments, the storing unit 230 may be implemented by one or more memories.

In some embodiments, the computer program (or computer program product) for implementing the method for tagging an object from a video according to any of the embodiments of the instant disclosure comprises an instruction, and the computer program can be stored in a computer storable medium.

As above, according to the embodiments, the position and the timestamp of the target object of the playing frame in a corresponding record video can be directly obtained from the object meta data, then a selectable area is displayed on the target object of the playing frame accordingly, so that a computer executing the method can rapidly and automatically tagging the target object in the video. Therefore, the record video can be managed, playbacked, and exported efficiently. For example, when the user finds an interested target object, the user can directly select the target object, so that the security surveillance system can automatically calculate the appear time and the disappear time of the target object according to the timestamps of the target object from the object meta data. Hence, the system can set the mark-in time and the mark-out time, and the target object showed up between the mark-in time and the mark-out time will automatically have the tag.

What is claimed is:

1. A method for tagging an object in a video, comprising:
    playing a video, wherein the video has a plurality of frames and the plurality of frames have a plurality of first frames showing a plurality of objects;
    selecting a target object in a playing frame of the plurality of frames by a cursor, wherein the playing frame is one of the first frames, and the target object is one of the objects;
    obtaining, from an object meta data, a plurality of bounding boxes that correspond to the target object and a plurality of timestamps that belong to the individual bounding boxes, wherein the timestamps correspond to the target frames of the first frames showing the objects respectively, and each target frame is the first frame showing the object identical to the target object;
    showing a selectable area in the playing frame according to the bounding box corresponding to the timestamp of the playing frame;
    generating at least one tag function item linking to the selectable area;

tagging the target frame for the timestamp belonging to each of the bounding boxes according to the bounding boxes when the one of the at least one tag function item is selected;
showing a sub timeline of the target object on a main timeline of the video according to the timestamps correspond to the target frames;
moving the cursor to a selected thumbnail image of a plurality of thumbnail images of the main timeline;
generating at least one timeline adjusting item, wherein the at least one timeline adjusting item comprises a mark-in item;
linking the at least one timeline adjusting item to the selected thumbnail image;
displaying the at least one timeline adjusting item;
receiving a selected signal of the mark-in item; and
resetting a start time and/or an end time of the sub timeline according to the selected signal and the selected thumbnail image.

2. The method according to claim 1, wherein the step of tagging the target frame for the timestamp belonging to each of the bounding boxes according to the bounding boxes comprises:
receiving a selected signal of one of the at least one tag function item; and
providing a choosing box to the corresponding target frame according to each timestamp and the bounding box corresponding to each timestamp in response to the selected signal, and providing the choosing box on the target object of the playing frame when any of the target frames corresponding to the timestamps is the playing frame.

3. The method according to claim 2, wherein the size of each choosing box and the positions of the playing frame which each of the choosing boxes is located at are determined by the corresponding bounding box.

4. The method according to claim 1, wherein the sub timeline has at least one thumbnail image of the target frames corresponding to the timestamps.

5. The method according to claim 1, wherein the step of tagging the target frame for the timestamp belonging to each of the bounding boxes according to the bounding boxes when the one of the at least one tag function item is selected comprises:
receiving a selected signal of one of the at least one tag function item; and
generating a tag according to the selected signal and linking the sub timeline to the tag.

6. The method according to claim 1, wherein the step of tagging the target frame for the timestamp belonging to each of the bounding boxes according to the bounding boxes when the one of the at least one tag function item is selected comprises:
receiving a first selected signal of one of the at least one tag function item;
providing at least one alternate tag item of at least one tag according to the first selected signal;
receiving a second selected signal of one of the at least one alternate tag item; and
linking the timestamps to the corresponding tag according to the second selected signal.

7. The method according to claim 1, wherein the step of obtaining the timestamps and the bounding boxes that correspond to the target object from the object meta data comprises:
finding out an object recognition code of the target object from the object meta data according to the timestamp of the playing frame; and
obtaining the timestamps and the bounding boxes from the object meta data according to the object recognition code.

8. The method according to claim 7, wherein the step of tagging the target frame for the timestamp belonging to each of the bounding boxes according to the bounding boxes when the one of the at least one tag function item is selected comprises:
receiving a selected signal of one of the at least one tag function item; and
tagging the target frame for the timestamp belonging to each bounding boxes according to each bounding box of the object recognition code in response to the selected signal.

9. The method according to claim 1, wherein the step of obtaining the timestamps and the bounding boxes that correspond to the target object from the object meta data comprises:
finding out an object recognition code of the target object from the object meta data according to the position of the playing frame which the cursor is located on, wherein the cursor is partially overlapped with an image of the target object in the playing frame; and
obtaining the timestamps and the bounding boxes from the object meta data according to the object recognition code.

10. A device for tagging an object in a video, comprising:
a processor configured to execute following steps:
playing a video, wherein the video has a plurality of frames and the frames have a plurality of first frames showing a plurality of objects;
selecting the target object in a playing frame of the frames by a cursor, wherein the playing frame is one of the first frames, and the target object is one of the objects;
obtaining, from an object meta data, a plurality of bounding boxes that correspond to the target object and a plurality of timestamps that belong to the individual bounding boxes, wherein each timestamp corresponds to one of a plurality of target frames of the first frames showing the objects and corresponds to one of the bounding box, and each the target frame is the first frame showing the object identical to the target object;
showing a selectable area in the playing frame according to the bounding box corresponding to the timestamp of the playing frame;
generating at least one tag function item linking to the selectable area; and
tagging the target frame for the timestamp belonging to each of the bounding boxes according to the bounding boxes when the one of the at least one tag function item is selected;
an image capture unit configured to capture the video; and
a display unit configured to display the playing frame, wherein the processor is further configured to execute following steps:
showing a sub timeline of the target object on a main timeline of the video according to the timestamps correspond to the target frames;
moving the cursor to a selected thumbnail image of a plurality of thumbnail images of the main timeline;

generating at least one timeline adjusting item, wherein the at least one timeline adjusting item comprises a mark-in item;

linking the at least one timeline adjusting item to the selected thumbnail images;

displaying the at least one timeline adjusting item on the display unit;

receiving a selected signal of the mark-in item; and resetting a start time and/or an end time of the sub timeline according to the selected signal and the selected thumbnail image.

11. The device for tagging an object in a video according to claim 10, wherein the processor executes the step of tagging the target frame for the timestamp belonging to each of the bounding boxes according to the bounding boxes when the one of the at least one tag function item is selected by:

receiving a selected signal of one of the at least one tag function item; and providing a choosing box to the corresponding target frame according to each timestamp and the bounding box corresponding to each timestamp in response to the selected signal, and providing the choosing box on the target object of the playing frame when any of the target frames corresponding to the timestamps is the playing frame.

12. The device for tagging an object in a video according to claim 10, wherein the processor executes the step of tagging the target frame for the timestamp belonging to each of the bounding boxes according to the bounding boxes when the one of the at least one tag function item is selected by:

receiving a first selected signal of one of the at least one tag function item;

providing at least one alternate tag item of at least one tag according to the first selected signal;

receiving a second selected signal of one of the at least one alternate tag item; and linking the timestamps to the corresponding tag according to the second selected signal.

13. The device for tagging an object in a video according to claim 10, wherein the processor executes the step of obtaining the timestamps and the bounding boxes that correspond to the target object from the object meta data by:

finding out an object recognition code of the target object from the object meta data according to the timestamp of the playing frame; and obtaining the timestamps and the bounding boxes from the object meta data according to the object recognition code.

14. The device for tagging an object in a video according to claim 10, wherein the processor executes the step of obtaining the timestamps and the bounding boxes that correspond to the target object from the object meta data by:

finding out an object recognition code of the target object from the object meta data according to the position of the playing frame which the cursor is located on, wherein the cursor is partially overlapped with an image of the target object in the playing frame; and obtaining the timestamps and the bounding boxes from the object meta data according to the object recognition code.

15. A non-transitory computer readable medium, comprising an instruction, wherein the instruction is loaded and executed by a computer to implement a method for tagging an object in a video, wherein the method comprises:

playing a video, wherein the video has a plurality of frames and the frames have a plurality of first frames showing a plurality of objects;

selecting a target object in a playing frame of the frames by a cursor, wherein the playing frame is one of the first frames, and the target object is one of the objects;

obtaining, from an object meta data, a plurality of bounding boxes that correspond to the target object and a plurality of timestamps that belong to the individual bounding boxes, wherein each timestamp corresponds to one of a plurality of target frames of the first frames showing the objects and corresponds to one of the bounding boxes, and each the target frame is the first frame showing the object identical to the target object;

showing a selectable area in the playing frame according to the bounding box corresponding to the timestamp of the playing frame;

generating at least one tag function item linking to the selectable area; and tagging the target frame for the timestamp belonging to each of the bounding boxes according to the bounding boxes when the one of the at least one tag function item is selected;

showing a selectable area in the playing frame according to the bounding box corresponding to the timestamp of the playing frame;

generating at least one tag function item linking to the selectable area;

tagging the target frame for the timestamp belonging to each of the bounding boxes according to the bounding boxes when the one of the at least one tag function item is selected;

showing a sub timeline of the target object on a main timeline of the video according to the timestamps correspond to the target frames;

moving the cursor to a selected thumbnail image of a plurality of thumbnail images of the main timeline;

generating at least one timeline adjusting item, wherein the at least one timeline adjusting item comprises a mark-in item;

linking the at least one timeline adjusting item to the selected thumbnail image;

displaying the at least one timeline adjusting item;

receiving a selected signal of the mark-in item; and resetting a start time and/or an end time of the sub timeline according to the selected signal and the selected thumbnail image.

* * * * *